United States Patent [19]

Matsumoto et al.

[11] Patent Number: 5,414,717
[45] Date of Patent: May 9, 1995

[54] MULTIPLEX COMMUNICATION CONTROL APPARATUS

[75] Inventors: Norio Matsumoto, Himeji; Kikuo Muramatsu, Itami, both of Japan

[73] Assignee: Mitsubishi Denki Kabushiki Kaisha, Tokyo, Japan

[21] Appl. No.: 986,711

[22] Filed: Dec. 8, 1992

[30] Foreign Application Priority Data

Dec. 10, 1991 [JP] Japan .................................. 3-325654

[51] Int. Cl.6 ............................................. H04L 1/22
[52] U.S. Cl. ................................. 371/32; 340/825.52; 370/85.1
[58] Field of Search ............... 371/32, 33; 340/825.06, 340/825.07, 825.08, 825.52, 825.53, 825.54; 370/85.1, 85.8, 92, 93

[56] References Cited
U.S. PATENT DOCUMENTS

| | | | |
|---|---|---|---|
| 4,352,103 | 9/1982 | Slater | 340/825.01 |
| 4,402,082 | 8/1983 | Cope | 371/22 |
| 4,896,151 | 1/1990 | Kuranami et al. | 340/825.52 |
| 5,001,642 | 6/1991 | Botzenhardt et al. | |
| 5,109,384 | 4/1992 | Tseung | 371/32 |
| 5,251,214 | 10/1993 | Mertens et al. | 340/825.52 |

*Primary Examiner*—Roy N. Envall, Jr.
*Assistant Examiner*—Thomas E. Brown
*Attorney, Agent, or Firm*—Sughrue, Mion, Zinn, Macpeak & Seas

[57] ABSTRACT

A NAK register, for storing negative acknowledgment data in the case where a transmission has not been received normally, is newly installed as an RSP register other than a ACK register. By controlling the delivery of reception response (RSP) from these registers according to a multi-destination communication signal and an error detection signal at an RSP control circuit, it becomes possible to announce occurrence of a reception error and an overrun error at the reception side terminal to transmission side terminals and the other reception side terminals. Thereby, there exists reception response from reception side terminals, in a communication frame at multi-destination communication, and a multiplex communication apparatus can be obtained, which can detect whether or not all of a plurality of reception side terminal have received a transmission normally.

3 Claims, 11 Drawing Sheets

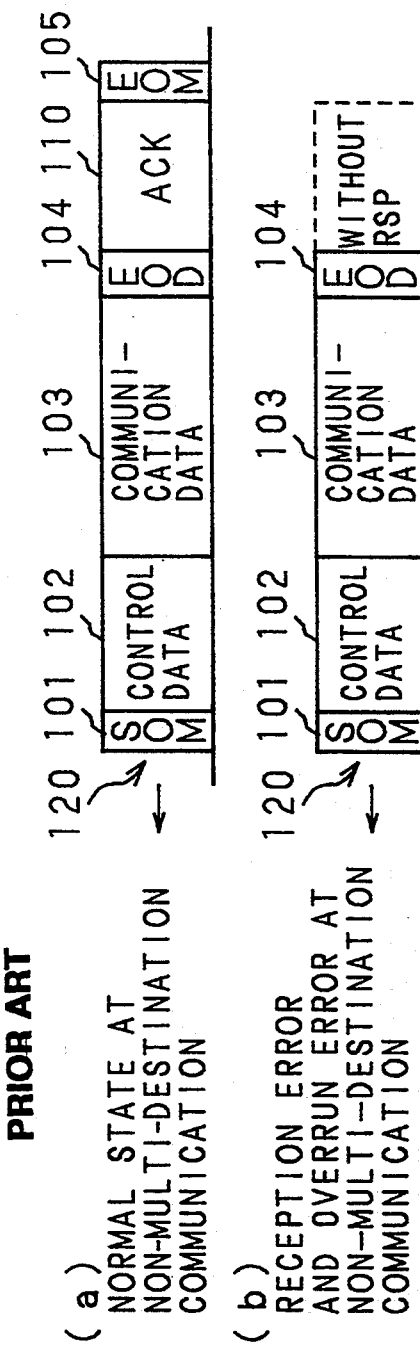
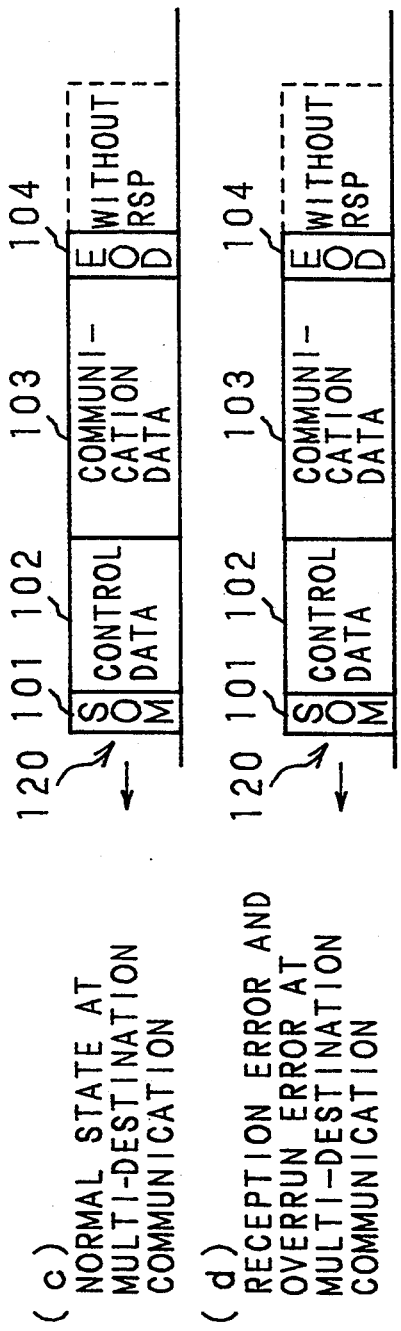
Fig. 3 PRIOR ART

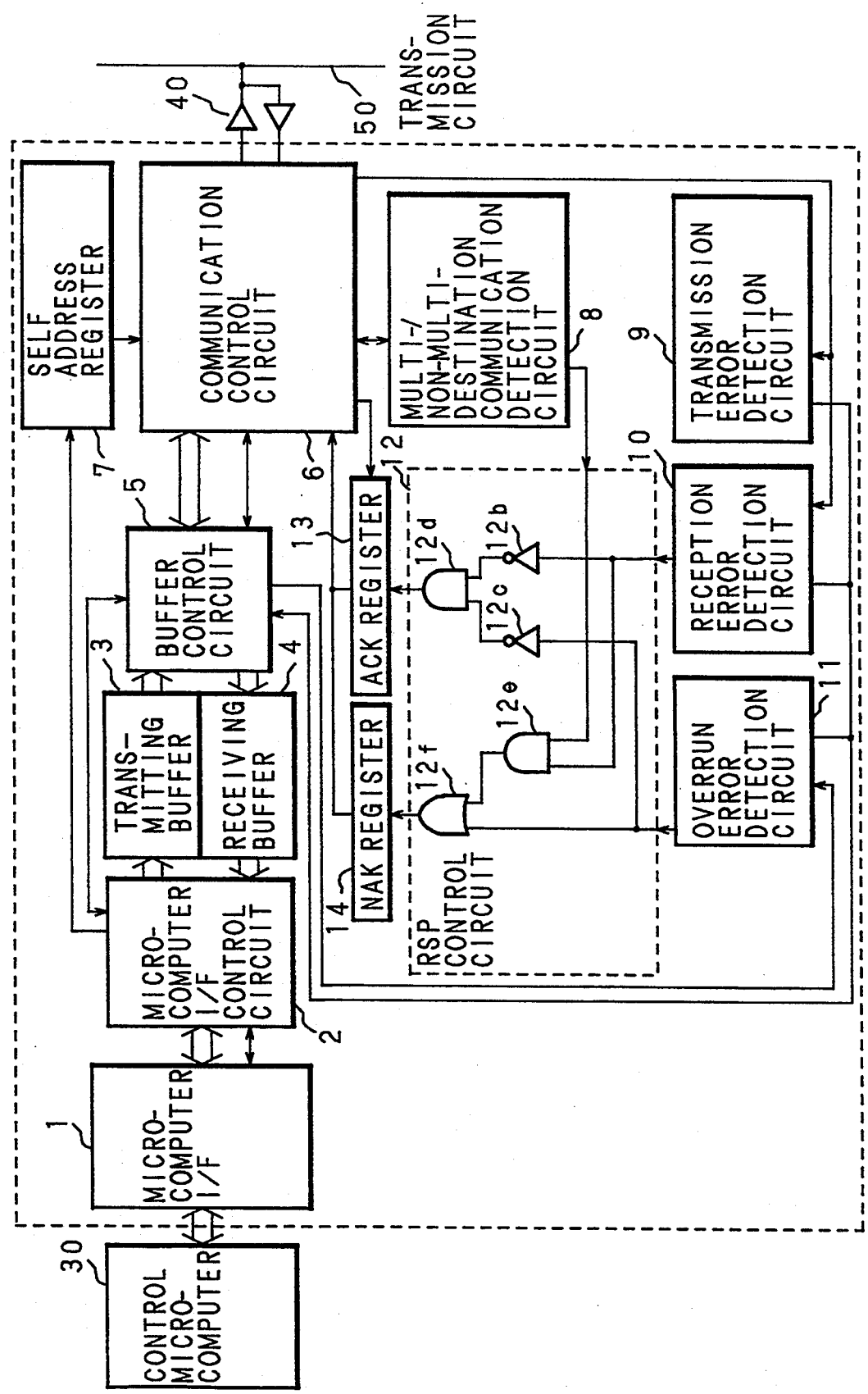

Fig. 5(a)
NON-MULTI-DESTINATION COMMUNICATION
ADDRESS DATA

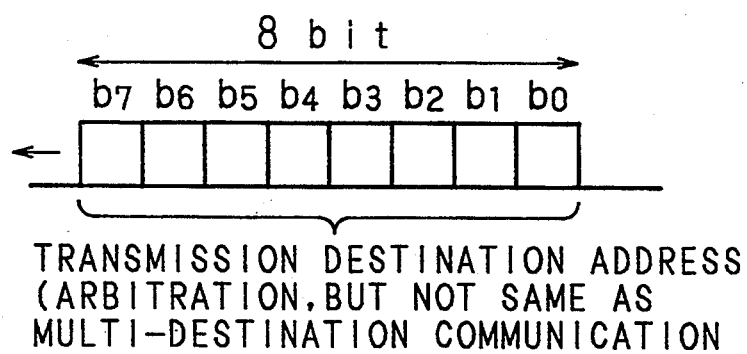

TRANSMISSION DESTINATION ADDRESS
(ARBITRATION, BUT NOT SAME AS
MULTI-DESTINATION COMMUNICATION

Fig. 5(b)
MULTI-DESTINATION COMMUNICATION
ADDRESS DATA

Fig. 5(c)
MULTI-DESTINATION COMMUNICATION
ACK DATA

Fig. 5(d)
MULTI-DESTINATION COMMUNICATION
NAK DATA

{ P: LOWER PRIORITY SIGNAL AT
    TRANSMISSION LINE (PASSIVE)
  D: HIGER PRIORITY SIGNAL AT
    TRANSMISSION LINE (DOMINANT)
}

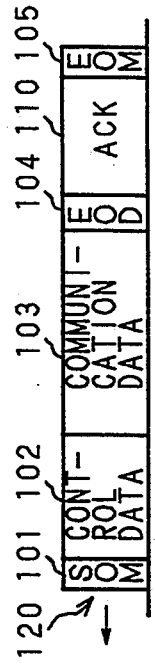

Fig. 6(a) NORMAL STATE AT NON-MULTI-DESTINATION COMMUNICATION

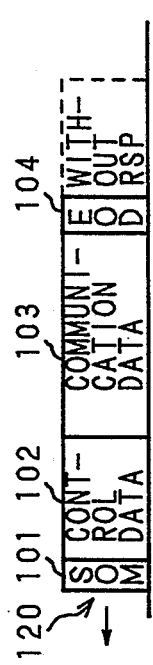

Fig. 6(b) RECEPTION ERROR AT NON-MULTI-DESTINATION COMMUNICATION

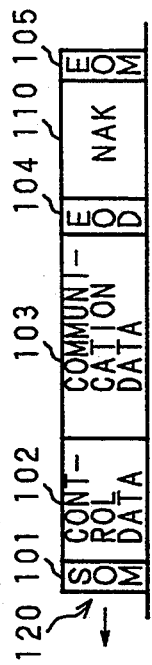

Fig. 6(c) OVERRUN ERROR AT NON-MULTI-DESTINATION COMMUNICATION

{ CONTROL DATA: INCLUDING DATA OF INDICATING TRANSMISSION DESTINATION (TRANSMISSION DESTINATION ADDRESS)
ACK: RECEPTION ACKNOWLEDGMENT (TRANSMISSION DESTINATION ADDRESS)
NAK: RECEPTION NEGATIVE ACKNOWLEDGMENT }

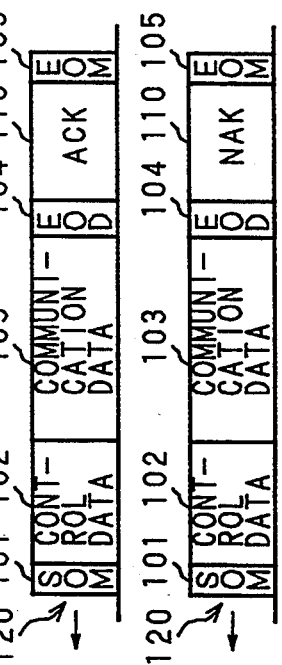

Fig. 6(d) NORMAL STATE AT MULTI-DESTINATION COMMUNICATION

Fig. 6(e) RECEPTION ERROR AND OVERRUN ERROR AT MULTI-DESTINATION COMMUNICATION

{ CONTROL DATA: INCLUDING DATA OF INDICATING TRANSMISSION DESTINATION (TRANSMISSION DESTINATION ADDRESS)
ACK: RECEPTION ACKNOWLEDGMENT (TRANSMISSION DESTINATION ADDRESS)
NAK: RECEPTION NEGATIVE ACKNOWLEDGMENT }

Fig. 9(a)
NON-MULTI-DESTINATION COMMUNICATION
ADDRESS DATA

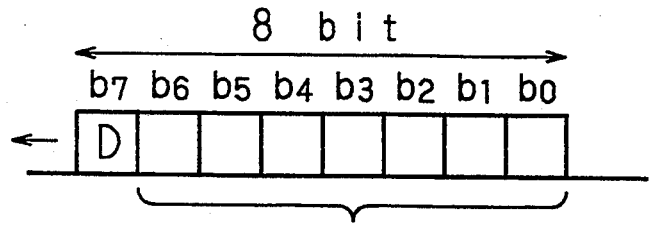

TRANSMISSION DESTINATION ADDRESS
(ARBITRATION, BUT NOT CONNTINUOUS OF DOMINANT)

Fig. 9(b)
NON-MULTI-DESTINATION COMMUNICATION
ACK DATA

AS SAME AS TRANSMITTED ADDRESS

Fig. 9(c)
NON-MULTI-DESTINATION COMMUNICATION
NAK DATA

Fig. 9(d)
MULTI-DESTINATION COMMUNICATION
ADDRESS DATA

Fig. 9(e)
MULTI-DESTINATION COMMUNICATION
ACK DATA

Fig. 9(f)
MULTI-DESTINATION COMMUNICATION
NAK DATA

- ACK/NAK FLAG (ONLY AT MULTI-DESTINATION COMMUNICATION)
- MULTI-/NON-/MULTI-DESTINATION COMMUNICATION FLAG

P: LOWER PRIORITY SIGNAL AT TRANSMISSION LINE(PASSIVE)
D: HIGER PRIORITY SIGNAL AT TRANSMISSION LINE(DOMINANT)

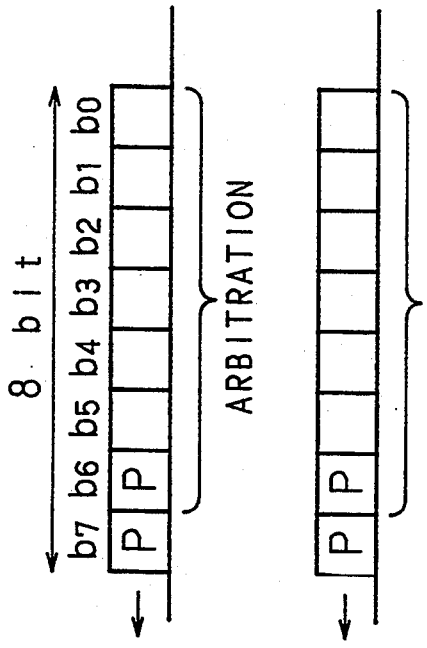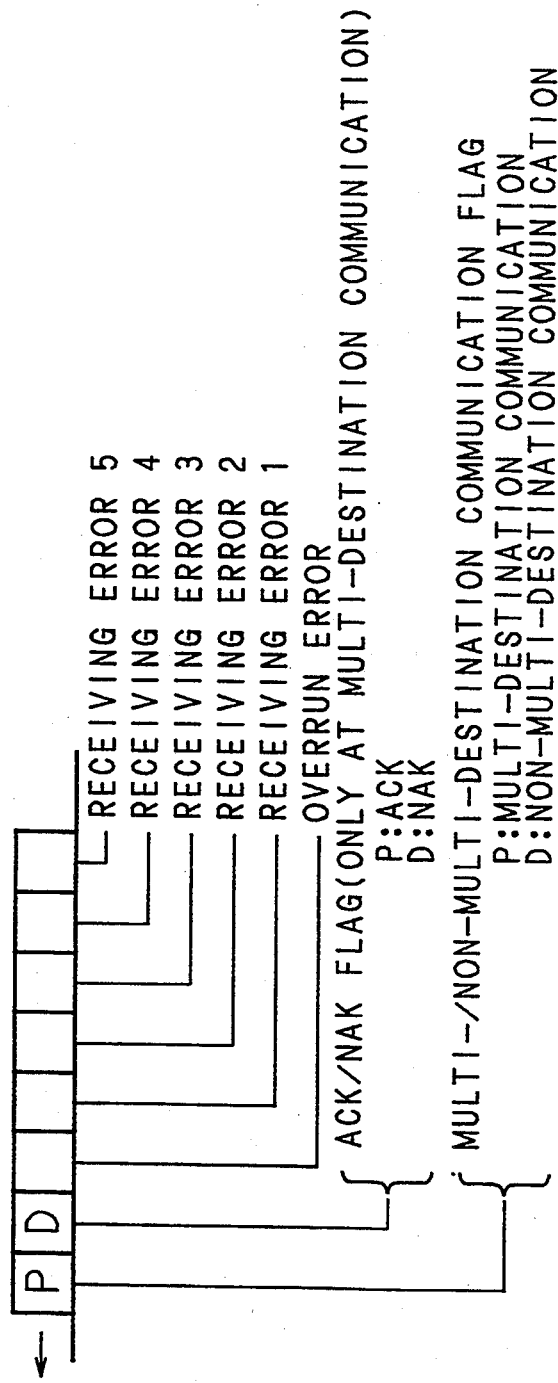
Fig. 10(a) MULTI-DESTINATION COMMUNICATION ADDRESS DATA
Fig. 10(b) MULTI-DESTINATION COMMUNICATION ACK DATA
Fig. 10(c) MULTI-DESTINATION COMMUNICATION NAK DATA

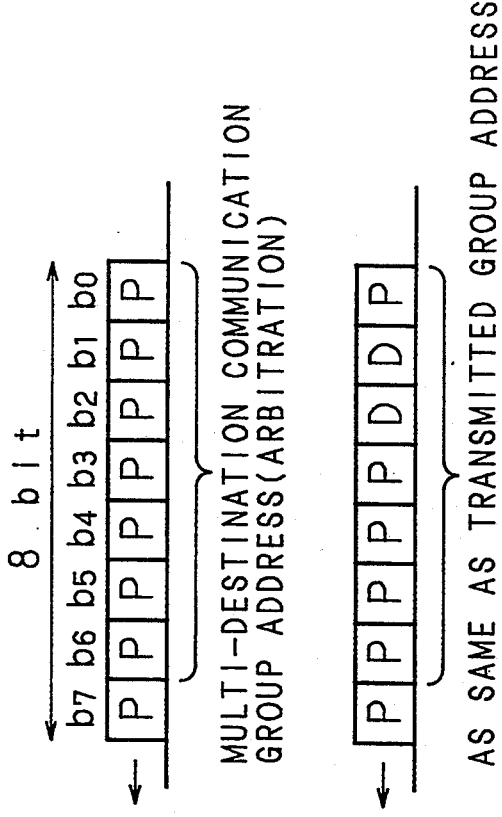
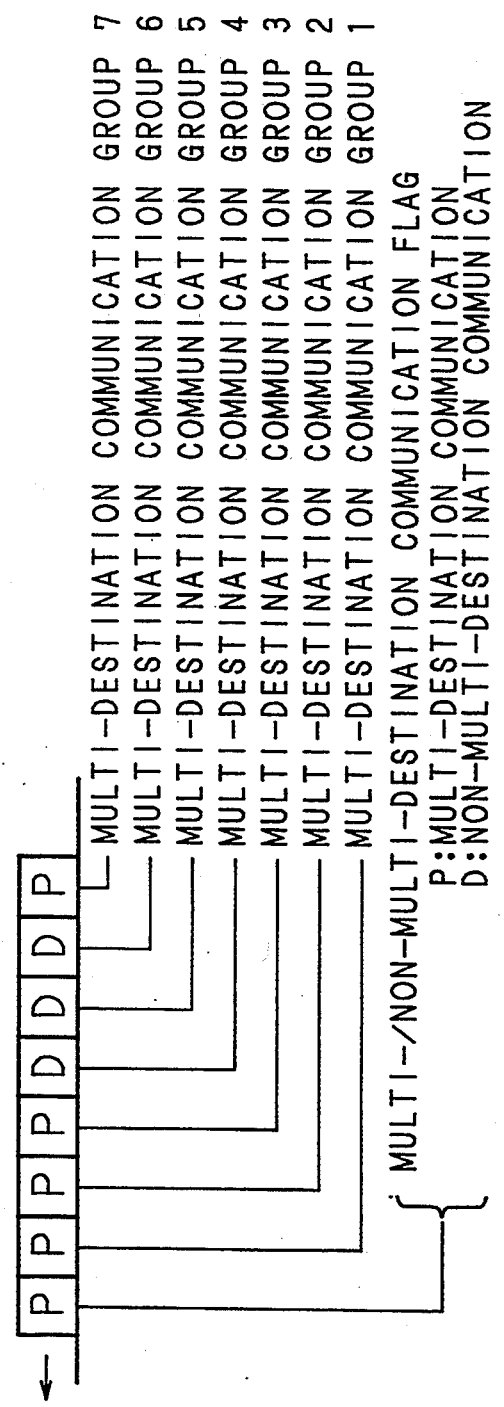
Fig. 11(a)
MULTI-DESTINATION COMMUNICATION ADDRESS DATA
(MULTI-DESTINATION COMMUNICATE FOR GROUP 1,2,3,4,7)
Fig. 11(b)
MULTI-DESTINATION COMMUNICATION ACK DATA
(AS SAME AS TRANSMITTED GROUP ADDRESS)
Fig. 11(c)
MULTI-DESTINATION COMMUNICATION NAK DATA
(GROUP 4 IS NAK)

MULTIPLEX COMMUNICATION CONTROL APPARATUS

BACKGROUND OF THE INVENTION

1. Field of the Invention

The present invention relates to a multiplex communication control apparatus which controls reception response (RSP) of multi-destination communication from one communication terminal to a plurality of communication terminals and of non-multi-destination communication from one communication terminal to another one in a multi communication system.

2. Description of the Related Art

FIG. 1 is a block diagram showing a configuration of a conventional multiplex communication control apparatus of each communication terminal in a multi communication system.

In FIG. 1, a portion surrounded by a broken line designates a multiplex communication control apparatus which is connected with a control microcomputer 30 and with a transmission line 50 through a bus transceiver 40. The configuration of the multiplex communication control apparatus is as follows.

Reference numeral 1 designates a microcomputer interface (I/F) which is connected with the control microcomputer 30 controlling the communication terminal and gives/receives data. The microcomputer interface 1 is controlled by a microcomputer interface control circuit 2 and gives/receives data between the multiplex communication control apparatus and the control microcomputer 30.

Reference numeral 3 designates a transmitting buffer for storing a transmitted data train which has been transferred from the control microcomputer 30 through the microcomputer interface 1 and is to be transmitted to another communication terminal. Reference numeral 4 designates a receiving buffer for storing a received data train which has been delivered from another communication terminal to this communication terminal through the transmission line 50. The transmitting buffer 3 and the receiving buffer 4 are controlled by a buffer control circuit 5 to store or read out the data train.

Reference numeral 6 designates a communication control circuit and this circuit 6 is connected with the transmission line 50 through a bus transceiver 40.

The communication control circuit 6 executes conversions of data trains in both of the buffers 3 and 4 and the communication data train at the transmission line 50. To be concrete, the communication control circuit 6 converts a parallel data train stored in the transmitting buffer 3 into communication frame which is to be delivered to the transmission line 50 and converts the communication frame at the transmission line 50 into a parallel data train so as to be stored in the receiving buffer 4. Transmission of data to another communication terminal and receiving of data from another communication terminal are controlled by CSMA/CD (Carrier Sense Multiple Access/Collision Detection) method.

Reference numeral 7 designates a self address register which stores a pre-determined peculiar address (self address) at each communication terminal, and a reception side terminal is appointed by the fact that the self address stored in the self address register 7 is transmitted as a control data in the communication frame.

Reference numeral 8 designates a multi-/non-multi-destination communication detection circuit which detects whether a transmission destination address (refer to FIG. 2) included in the control data in the communication frame received by the communication control circuit 6 is a multi-destination communication address (refer to FIG. 5(b)). The multi-destination communication is expressed by a lower priority (passive) signal train at the transmission line 50. The non-multi-destination communication, destined exclusively from one communication terminal to another one, is designating by a transmission destination address.

Reference numeral 9 designates a transmission error detection circuit as a supervision circuit which supervises whether or not anything abnormal happens in the transmitting state. The circuit 9 detects an error included in communication data which is transmitted to the transmission line 50 from the communication control circuit 6 at the transmitting time. Reference numeral 10 designates a reception error detection circuit as a supervision circuit which supervises whether or not anything abnormal happens in receiving state. The circuit 10 detects an error included in communication data which is transmitted to the transmission line 50 from the communication control circuit at the receiving time. Further, reference numeral 11 designates an overrun error detection circuit as a supervision circuit which supervises the state of the receiving buffer 4 at the receiving time, and the circuit 11 detects whether or not the receiving buffer 4 is in a full state at the receiving time.

Reference numeral 12 is an RSP control circuit which controls reception response (RSP) by an error signal and a multi-destination signal outputted from the aforesaid error detection circuits 10 and 11 and the multi-/non-multi-destination communication detection circuit 8 respectively. This RSP control circuit 12 gives an RSP transmission indication to an ACK register 13.

The ACK register 13 stores reception acknowledgment (ACK) data which sends it back to a transmission side terminal in the case where reception is completed normally.

The RSP control circuit 12 is composed of inverters 12a, 12b and 12c which input a multi-destination signal being an output signal from the multi-/non-multi-destination communication detection signal 8, output signals from the reception error detection circuit 10 and the overrun error detection circuit respectively, and a 3-input AND gate 12d which inputs the outputs from the respective inverters 12a, 12b and 12c. The output of the AND gate 12d is given to the ACK register 13.

FIG. 2(a) through FIG. 2(c) are schematic diagrams each showing configuration of data train (hereinafter frame) which is transmitted/received by a multi communication system.

As shown in FIG. 2(a), a transmission frame 100 is delivered from the transmission side terminal, the frame 100 being composed of identifier (SOM) 101 showing the start of transmission, a control data 102 including data indicating a transmission destination (transmission destination address), communication data 103 being communication content, identifier (EOD) 104 showing the end of communication data 103, and identifier (EOM) 105 showing the end of transmission from the transmission side terminal.

As shown in FIG. 2(b), at a reception side terminal, after identifier (EOD) 104 indicating end of transmission data of the transmission frame 100 is received by the reception side terminal, RSP 110 showing success or failure of reception is sent back therefrom. Since these data, that is, transmission frame 100 and RSP 110 are delivered to the same transmission line 50, communication is performed with a frame 120 having a configuration shown in FIG. 2(c).

Next, explanation will be given on the operation of a conventional multiplex communication control apparatus which is so configured as aforementioned and communicates data having such a frame configuration as aforementioned. In addition, FIG. 3(a) through FIG. 3(d) are schematic diagrams each showing a configuration of a communication frame of a conventional multiplex communication system.

The data train sent at the time of communication processing is transferred and stored in the transmitting buffer 3 from the control microcomputer 30 through the microcomputer interface 1 and microcomputer interface control circuit 2. When the transmit data is stored in the transmitting buffer 3, the buffer control circuit 5 transmits a transmit requesting signal to the communication control circuit 6. When the communication control circuit 6 receives the signal, it monitors the state of the transmission line 50 through the bus transceiver 40, and at that time, in the case where the transmission line 50 is detected to be in the state of non-communication (idle), it converts parallel data in the transmitting buffer 3 into serial data being from SOM 101 to EOD 104 of the communication frame 100 as shown in FIG. 2(a) so as to transmit it to the transmission line 50 and prepares to receive RSP from the reception side terminal.

The reception processing is performed in the aforesaid procedure, wherein serial communication data 120 having been delivered to the transmission line 50 from another communication terminal is detected by the communication control circuit 6 through the bus transceiver 40 serial data at the transmission line 50 is separated and detected according to communication frame and is converted into parallel data which can be stored in the receiving buffer 4. The communication control circuit 6 compares a transmission destination address included in control data 102 transmitted following identifier (SOM) 101 showing the start of transmission in communication frame 120 with a self address stored in the self address register 7 and judges whether or not communication frame 120 is destined for itself.

At the same time, the multi-/non-multi-destination communication detection circuit 8 judges whether or not a transmission destination address is a dedicated address (multi-destination address) for multi-destination communication received by all of the terminals other than a transmission side terminal. In the case where a transmission destination address is detected that it coincides either with a self address our with a multi-destination address, the transmission destination address is stored in the ACK register 13 as ACK data to be sent back at the time of normal reception as well as communication data 103 having been transmitted as communication frame 120 following the control data 102 which is converted into parallel data. At this time, the overrun error detection circuit 11 detects whether or not the receiving buffer 4 is already full of received data, and only in the case where the receiving buffer is confirmed to be empty, both of control data and communication data are stored in the receiving buffer 4 through the buffer control circuit 5.

In the case where the overrun error detection circuit 11 detects an overrun error of the receiving buffer 4 being in the full state, the buffer control circuit 5 prohibits receive data from being stored in the receiving buffer 4 and abandons this received data.

In the non-multi-destination communication, a transmission destination address and a self address coincide with each other. In the case where the reception error detection circuit 10, which detects whether or not an error state not satisfying a frame agreement and a bit agreement of data has occurred, does not detect an error, and the aforesaid overrun error detection circuit 11 does not detect an error in a reception period of a communication frame from SOM 101 to EOD 104 having been detected by the communication control circuit 6, the fact that a reception error and an overrun error did not occur is announced to the RSP control circuit 12 by a predetermined signal. When the RSP control circuit 12 receives the signal, after detecting EOD 104, it delivers transmission address data stored in advance in the ACK register 13 according to the aforesaid processing to the transmission line 50 as ACK data through the communication control circuit 6 and announces to the transmission side terminal that a normal transmission has been done (refer to FIG. 3(a)).

In the case where the fact that a reception error or an overrun error occurs is detected by the reception error detection circuit 10 or the overrun error detection circuit 11, the RSP control circuit 12 prohibits the data stored in the ACK register 13 from being delivered. It also announces to the transmission side terminal that an error has occurred at a reception side terminal by not delivering the RSP 110 to the transmission line 50 (refer to FIG. 3(b)).

The transmission side terminal detects RSP 110, which has been sent back from the reception side terminal after EOD 104 of the communication frame 120, by the transmission error detection circuit 9 through the communication control circuit 6, thereby confirming whether or not the sent back data is normally received at the reception side terminal. In the case where RSP 110 is not, sent, back, it announces to the buffer control circuit 5 that a transmission error occurred. The buffer control circuit 5 announces to the control microcomputer 30 the occurrence of the transmission error through the microcomputer interface control circuit 2. In answer to this, the control microcomputer 30 makes the transmission side terminal perform a transmission control such as re-sending.

In multi-destination communication in which a multi-destination address is designated as a transmission destination address, all of the communication terminals other than a transmission side terminal become the reception side terminals. In this case, when a reception error or an overrun error occurs at one reception side terminal, the terminal does not deliver RSP in the same way as the case of non-multi-destination communication. Therefore, when the fact that an error occurs is announced from the reception terminal to the transmission side terminal, in the case where ACK is delivered from other terminals at which a transmission has been received normally, the transmission frame 100 without RSP 110 which has lower priority at the transmission line 50 is not sent back. Therefore, RSP 110 is not delivered regardless of a presence of error occurrence (refer to FIG. (c), (d)). Therefore, also at the transmission side terminal, the transmission error detection circuit 9 does not detect an error concerning RSP 110. Accordingly, the error concerning RSP 110 is not announced to the control microcomputer 30 through the buffer control circuit 5.

By the way, the conventional multiplex communication control apparatus is so constructed as aforementioned RSP from a reception side terminal to a transmission side terminals does not exist at the time of multi-destination communication, and the fact whether or not all of a plurality of the reception side terminal received a transmission normally cannot confirmed at the transmission side terminal. Especially, in the case where an overrun error at the reception side terminal occurs, error effect does not appear at the transmission line. Therefore there is a problem that there are terminals at which a transmission has been received normally and terminals at which a transmission cannot have been received normally. Also at the time of non-multi-destination communication, the transmission side terminal cannot distinguish between a reception error from an overrun error, therefore there is a problem that the period of re-sending a transmission cannot be controlled.

SUMMARY OF THE INVENTION

The present invention has been devised in order to solve such problems as aforementioned, and the object thereof is to provide a multiplex communication apparatus which can detect at a transmission side terminal whether or not all of a plurality of reception side terminals have received a transmission normally by existence of the RSP from the reception side terminals in a communication frame at multi-destination communication, and further, the object thereof is to provide a multiplex communication control apparatus capable of solving such a disunity that some reception side terminals receive a transmission normally and others abnormally at the time of an overrun.

The multiplex communication control apparatus is newly provided with a NAK register for storing NAK data of the case where it has not received a transmission normally besides an ACK register for storing ACK data of the case where it has received a transmission normally, and is so configured that the delivery of RSP from these registers is controlled according to a multi-destination-communication signal and an error detection signal at the RSP control circuit. It is also so configured that data stored in the receiving buffer, which temporarily stores received data, is to be erased in the case where other terminal receives the data abnormally during multi-destination communication.

In the multiplex communication control apparatus of the present invention, NAK data stored in the NAK register is detected to be multi-destination-communication by the multi-non-multi-destination communication detection circuit and is delivered to the transmission line through the communication control circuit by the RSP control circuit from the terminal where a communication error has been detected by the error detection circuit. Therefore, an abnormality is announced to the other terminals which received a transmission normally and the transmission side terminal. In the case where an error is detected at any of the reception side terminals and NAK data is delivered to the transmission line at multi-destination communication, the content of the receiving buffer is erased at the other reception side terminals, and reception can be carried out again at the next re-transmission.

The above and further objects and features of the invention will more fully be apparent from the following detailed description with accompanying drawings.

BRIEF DESCRIPTION OF THE DRAWINGS

FIG. 3 is a schematic diagram showing configurations of communication frames of the conventional multi communication system, FIG. 4 is a block diagram showing a configuration of one embodiment of a multiplex communication control apparatus of the invention, FIG. 5(a) through FIG. 5(d) are schematic diagrams showing bit configurations of transmission destination address data, acknowledgment (ACK) data, and negative acknowledgment (NAK) data, processed by the multiplex communication control apparatus of the invention, FIG. 6(a) through FIG. 6(e) are schematic diagrams showing configurations of communication frames of a multi communication system according to the multiplex communication control apparatus of the invention, FIG. 9(a) through FIG. 9(f) are schematic diagrams showing bit configuration examples of transmission destination address data, acknowledgment (ACK) data, and NAK data at non-multi-destination communication and multi-destination communication, FIG. 10(a) through FIG. 10(c) are schematic diagrams showing another bit-configuration examples of transmission destination address data, acknowledgment. (ACK) data, and NAK data at non-multi-destination communication and multi-destination communication, and FIG. 11(a) through FIG. 11(c) are schematic diagrams showing further another bit-configuration examples of transmission destination address data, acknowledgment (ACK) data, and NAK data at non-multi-destination communication and multi-destination-communication.

DESCRIPTION OF THE PREFERRED EMBODIMENTS

In the following, the present invention will be described referring to drawings showing embodiments thereof.

Figure 1:
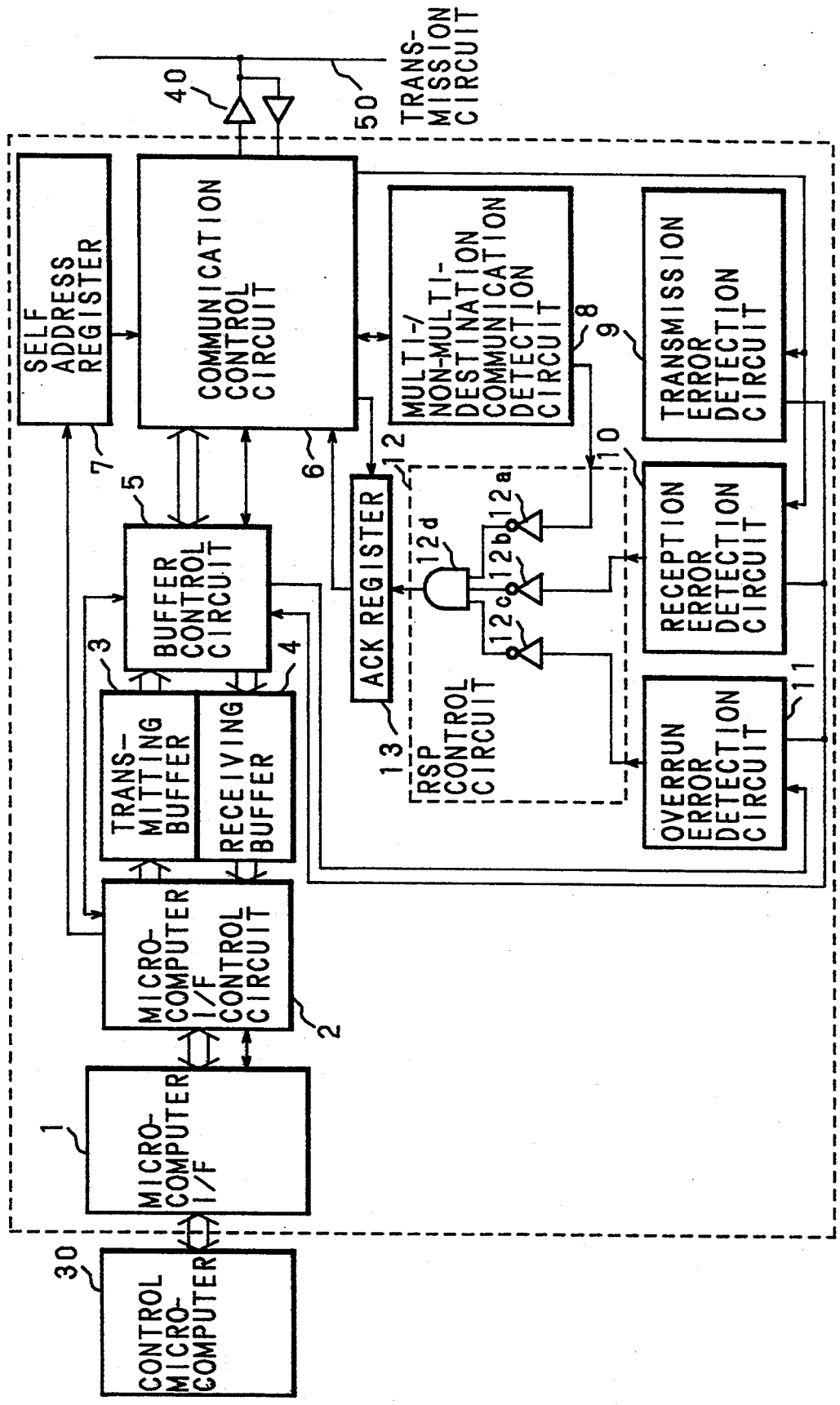
FIG. 1 is a block diagram showing a configuration of a conventional multiplex communication control apparatus of each communication terminal in a multi communication system.

FIG. 4 is a block diagram showing a configuration of one embodiment of a multiplex communication control apparatus of the invention, wherein the same reference characters as in FIG. 1 having been referred in the aforesaid explanation of the conventional example show the same or corresponding portions. In addition, FIG. 5(a) through FIG. 5(d) are schematic diagrams showing configurations of communication frames in the multi communication system of the invention.

In FIG. 4, a part surrounded by a broken line is the multiplex communication control apparatus of the invention, which is connected with the control microcomputer 30 and with the transmission line 50 through the bus transceiver 40. The configuration of the multiplex communication control apparatus of the invention is as follows.

Reference character 1 designates a microcomputer interface (I/F) for giving/receiving data by being connected with the microcomputer 30 controlling a communication terminal. The microcomputer interface 1 is controlled by the microcomputer interface control circuit 2 so as to conduct giving/receiving data between the multiplex communication control apparatus and the control microcomputer 30.

Reference character 3 designates a transmitting buffer for storing a transmission data train which has been transferred from the control microcomputer 30 through the microcomputer interface 1 and is to be transmitted to the other communication terminal. Reference character 4 designates a receiving buffer for storing a reception data train which has been delivered from another communication terminal and has been transmitted to this communication terminal through the transmission line 50. The transmitting buffer 3 and the receiving buffer 4 are controlled by the buffer control circuit 5 so that storing and reading out of the data train are carried out..

Reference character 6 designates a communication control circuit which is connected with the transmission line 50 through the bus transceiver 40. The communication control circuit 6 executes conversions of a data train in both buffers 3 and 4 and a communication data train at the transmission line 50. To be concrete, the communication control circuit 6 converts a parallel data train stored in tile transmitting buffer 3 into a communication frame to be delivered to the transmission line 50, and converts communication frame at the transmission line 50 to a parallel data train so as to be stored in the receiving buffer 4. Transmission of data to another communication terminal and receiving of data from another communication terminal are controlled by CSMA/CD (Carrier Sense Multiple Access/Collision Detection) method.

Reference character 7 designates a self address register which stores at each of the communication terminals a predetermined address (self address). A reception side terminal is designated by transmitting a self address stored in the self address register 7 as control data in the communication frame.

Reference character 8 designates a multi-/non-multi-destination communication detection circuit, which detects whether or not a transmission destination address (refer to FIG. 2) included in control data in a communication frame received by the communication control circuit 6 is a multi-destination communication address (refer to FIG. 5(b)). The multi-destination communication is expressed by a lower priority (passive) signal train at the transmission line 50. A non-multi-destination communication address (refer to FIG. 5(a)) destined from one communication terminal to another one, is designated by a transmission destination address other than the transmission terminal.

Reference character 9 designates a transmission error detection circuit as a supervision circuit supervising whether or not anything abnormal occurs in transmission state. The circuit 9 detects an error included in communication data delivered to the transmission line 50 from the communication control circuit 6 at the time of transmission. Reference character 10 designates a reception error detection circuit as a supervision circuit supervising whether or not anything abnormal occurs in reception state. The circuit 10 detects an error included in communication data delivered to the transmission line 50 From the transmission control circuit 6 at the time of reception. Further, reference character 11 designates an overrun error detection circuit as a supervision circuit which supervises a state of the receiving buffer 4 at the time of reception, and the circuit 11 detects whether or not the receiving buffer 4 is in the full state at the time of reception.

Reference character 12 designates an RSP control circuit which controls response (RSP) by an error signal and a multi-destination signal outputted from the aforesaid error detection circuit 10 and 11 anti from the multi-/non-multi-destination communication detection circuit 8. The RSP control circuit 12 controls the ACK register 13 and the NAK register 14 to transmit RSP.

The ACK register 13 stores reception acknowledgment data (ACK data), as shown in FIG. 5(c), which is to be sent back to a transmission side terminal in the case where reception is completed normally. The NAK register 14 stores NAK data, as shown in FIG. 5(d), being a signal train which announces when anything abnormal occurs at the time of reception to the transmission side terminal and has high priority (dominant) at transmission line 50.

Figure 2:
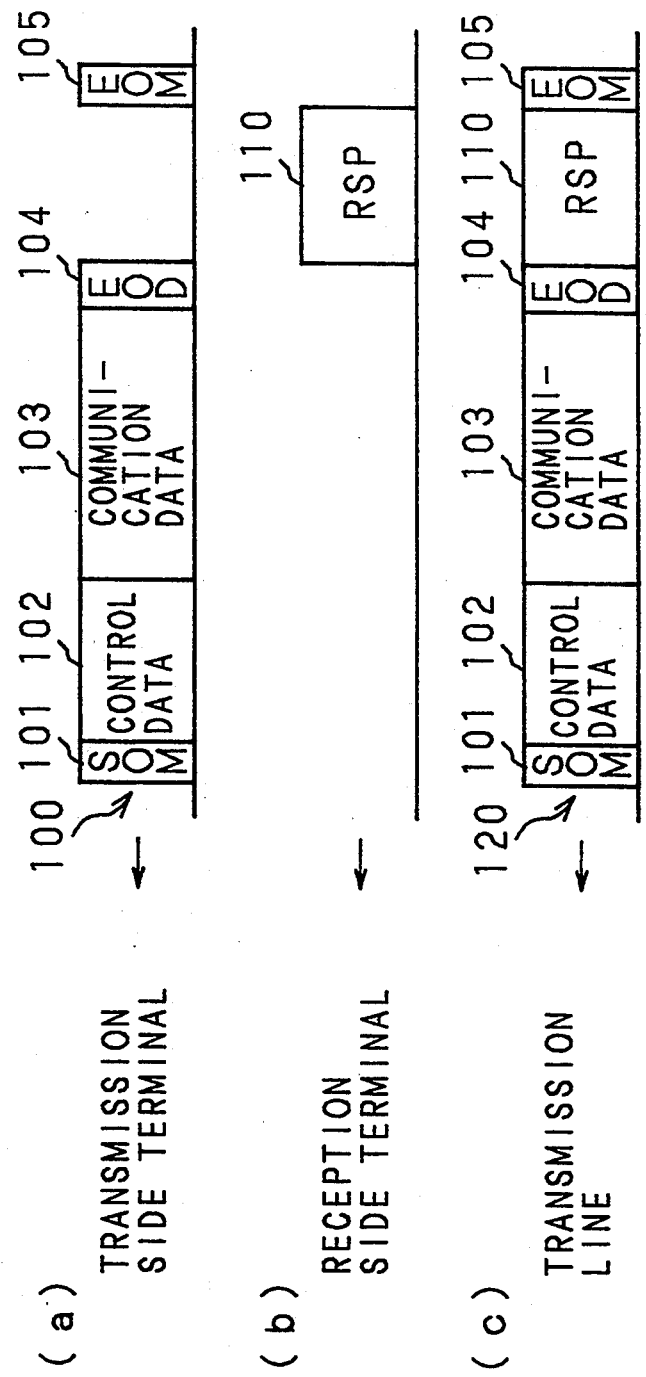
FIG. 2 is a schematic diagram showing configurations of data trains (hereinafter frame) transmitted/received in the multi communication system.

In addition, the configuration of a frame communicated in the multiplex communication control apparatus of the invention is same as that of the conventional one, and is shown in a schematic diagram of FIG. 2.

The RSP control circuit 12 is composed of inverters 12b and 12c inputting output signals from the reception error detection circuit 10 and the overrun error detection circuit 11 respectively, a 2-input AND gate 12d inputting outputs from the inverters 12b and 12c, and a 2-input AND gate 12e inputting a multi-destination communication signal being an output signal of the multi-/non-multi-destination communication detection circuit 8 and an output signal of the reception error detection circuit 10, and of a 2-input OR gate 12f inputting an output of the AND gate 12e and an output signal of the overrun error detection circuit 11. An output of the AND gate 12d is given to the ACK register 13, and an output of the OR gate 12f is given to the NAK register 14.

Figure 7:
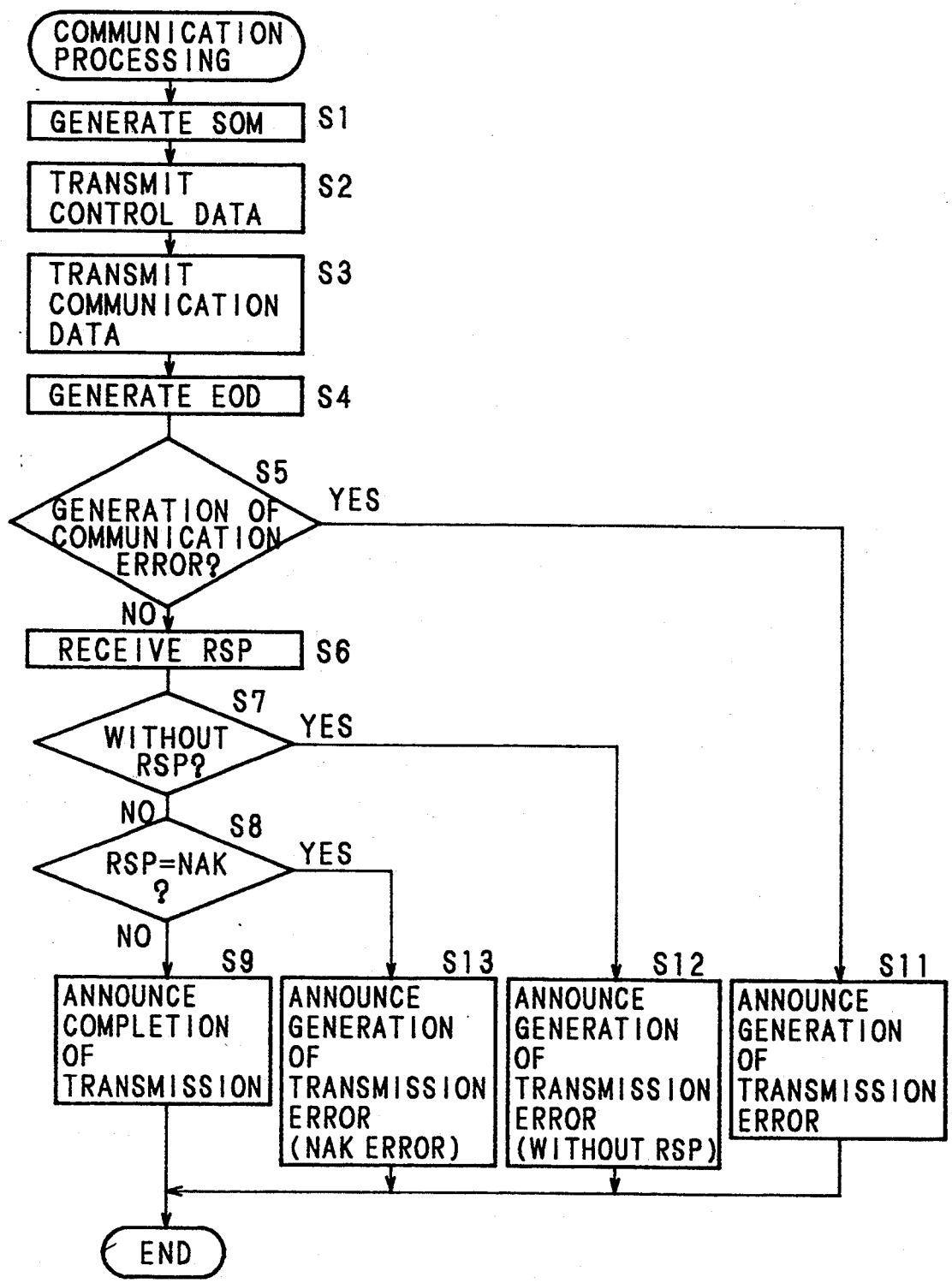
FIG. 7 is a flow chart showing processings of a transmission side terminal of the multiplex communication control apparatus of the invention.
Figure 8:
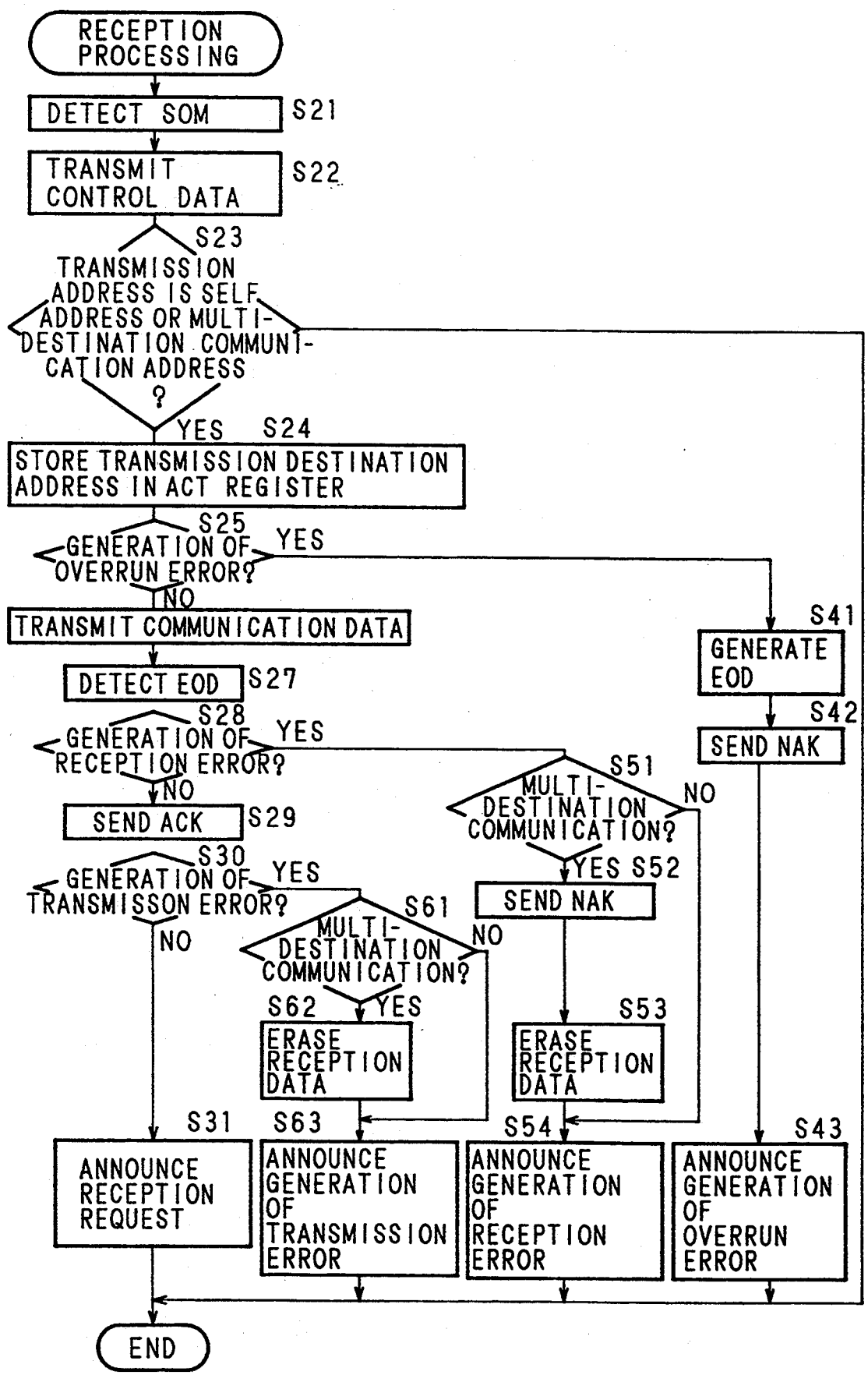
FIG. 8 is a flow chart showing processings of a reception side terminal of the multiplex communication control apparatus of the invention.

In the following, explanation will be given on the operation of the multiplex communication control apparatus of the invention. FIG. 7 and FIG. 8 are flow charts showing outlines of the transmission processing and the reception processing of the multiplex communication control apparatus of the invention, FIG. 7 being a flowchart of a transmission side terminal and FIG. 8 being a flowchart of a reception side terminal.

Even in the multiplex communication control apparatus of the invention, the transmission processing are same as those in the aforesaid conventional apparatus and a data train sent back in transmission processing is transferred and stored in the transmitting buffer 3 from the control microcomputer 30 through the microcomputer interface 1 and the microcomputer interface control circuit 2. When the transmission data is stored in the transmitting buffer 3, the buffer control circuit 5 transmits a transmission request signal to the communication control circuit 6. When the communication control circuit 6 receives the signal, it monitors the state of the transmission line 50 through the bus transceiver 40. At the time, when the transmission line 50 is detected to be idle, the control circuit 6 converts parallel data in the transmitting buffer 3 into serial data being from SOM 101 to EOD 104 of a communication frame 100 as shown in FIG. 2(a) so as to transmit it to the transmission line 50 and prepares for RSP from a reception side terminal.

The reception processings are performed in a procedure as aforementioned, wherein the serial communication data 120 having been delivered from another communication terminal to the transmission line 50 is detected by the communication control circuit 6 through the bus transceiver 40. Serial data at the transmission line 50 is separated and detected according to a communication frame so as to be converted into parallel data which can be stored in the receiving buffer 4. The communication control circuit 6 receives control data 102 to be transmitted following the identifier (SOM) 101 indicating a start of transmission in the communication frame 120 (step S21, S22), and compares a transmission destination address included in the control data 102 with a self address stored in the self address register 7, so as to judge whether or not the communication frame 120 is delivered to the communication terminal of itself (step 23).

At the same time, the multi/non-multi destination communication detection circuit 8 judges whether or not a transmission destination address is a dedicated address (multi-destination address) of a multi destination communication received by all of the terminals other than a transmission side terminal, that is, a lower priority (passive) signal train. In the case where a multi-destination address is detected, it announces to the communication control circuit 6 and the RSP control circuit 12 that a communication is a multi-destination communication.

In the case where a transmission destination address coincides with either a self address or a multi-destination address in step S23, the transmission destination address is stored in the ACK register 13 as ACK data to be sent back when a communication is received normally (step S24) as well as the communication data 103, being transmitted as the communication frame 120 following the control data 102, is converted into parallel data. Also at this time, the overrun error detection circuit 11 detects whether or not the receiving buffer 4 is already full of reception data, that is, whether or not an overrun error occurs (step S25). In the case where it is confirmed that the receiving buffer 4 is empty, that is, there is no occurrence of an overrun error, both of control data and communication data are stored in the receiving buffer 4 through the buffer control circuit 5 (step S26).

In the case where the overrun error detection circuit 11 detects an overrun error of the state where the receiving buffer 4 is in the full state, the buffer control circuit 5 prohibits the receiving buffer 4 from storing reception data and discards the reception data.

In the non-multi-destination communication, one transmission side terminal is designated to one reception side terminal. In the case where occurrence of an error is not detected either by the reception error detection circuit 10 or by the overrun error detection circuit 11 which detect whether or not a state not satisfying a frame agreement and a bit agreement occurs at the time of receiving data, from SOM 101 to EOD 104 of a communication frame. The RSP control circuit 12, after detecting EOD (step S27), delivers transmission destination address data which had been stored in the ACK register 13 according to the aforesaid processing, to the transmission line 50 through the communication control circuit 6 by a frame shown in FIG. 6(a) (step S29). The ACK data announces the transmission side terminal that a transmission has been received normally (step S31).

In the case where an occurrence of a reception error is detected by the reception error detection circuit 10 (step S28), the RSP control circuit 12 prohibits the ACK register 13 and the NAK register 14 from delivering data stored therein. It also does not deliver RSP 110 after EOD 104 to the transmission line 50 by the frame shown in FIG. 6(b). Thus it announces that a reception error has occurred at the reception side terminal (step S51, S54) and requests the terminal to deliver a transmit again from the transmission side terminal.

In the case where the overrun error detection circuit 11 detects an occurrence of an overrun error of the state where the receiving buffer 4 has no empty area (step S25), the RSP control circuit 12, after detecting the EOD 104 (step S41), delivers NAK data of higher priority (dominant) signal train at the transmission line 50 stored in the NAK register 14 to the transmission line 50 by the frame shown in FIG. 6(c) through the communication control circuit 6 (step S42). Thus it announces that an overrun error has occurred at the reception side terminal (step S43) and the transmission side terminal to deliver again a transmission after a time delay for reading out the receiving buffer 4.

At the transmission side terminal, the frame to which RSP 110 is added or the frame to which RSP 110 is not added after the EOD 104 sent back by the reception side terminal is converted into parallel data from serial data by the communication control circuit 6. This RSP data is detected by the transmission error detection circuit 9 (step S6, S7, S8). In the case where the RSP data is detected and the RSP data coincides with a transmission destination address, it is judged that a transmission has been received normally at the reception side terminal and completion of normal transmission is announced to the buffer control circuit 5 (step S9). The buffer control circuit 5 announces to the control microcomputer 30 through the microcomputer interface control circuit 2 the completion of normal transmission and allowance of writing of new communication data into the transmitting buffer 3.

In the case where the transmission error detection circuit 9 judges that there is no RSP 110 or that RSP data is NAK (step S7, S8), the transmission error detection circuit 9 announces occurrence of a no RSP error or a NAK error to the buffer control circuit 5 (step S12, S13). The buffer control circuit 5 announces the occurrence of the aforesaid error to the control microcomputer 30 and requests to deliver transmission data again or requests to process of resending a transmission after a time delay for reading out the receiving buffer 4 at the reception site terminal.

In multi-destination communication in which lower priority (passive) signal train at transmission line 50 as transmission destination address is designated, in the case where all of the reception side terminals other than a transmission side terminal do not detect an occurrence of an error at each reception error detection circuit 10 and over-run error detection circuit 11 (step S25, S28), the RSP control circuit 12, after detecting EOD 110, delivers multi-destination address data stored in the ACK register 13 according to the aforesaid processing to the transmission line 50 at the same time through the communication control circuit 6 (step S29). Since the multi-destination address data is lower priority (passive) signal train at the transmission line 50, it is delivered from a plurality of transmission side terminals at the same time. In the case where it superimposes on each other at the transmission line 50, it does not change itself, and is sent back to the transmission side terminal as ACK data by a frame shown in FIG. 6(d), thereby announcing that all of the reception side terminals received a transmission normally (step S30, S31).

In the case where a reception error or an overrun error is detected at any of the reception side terminals (Step S28, S25), the RSP control circuit 12 receives an error occurrence signal outputted from the reception error detection circuit 10 or the overrun error detection circuit 11 and delivers NAK data stored in the NAK register 14 to the transmission line 50 through the communication control circuit 6 (steps S52, S42). At the same time, ACK data is delivered from communication terminal at which a transmission is received normally without an error (Step S29). However NAK data being a higher priority (dominant) signal at the transmission line 50, is superimposed over a lower priority (passive) signal. Thus, as shown in FIG. 6(e), only a higher priority (dominant) signal is transmitted at the transmission line 50. Therefore occurrence of an error is announced to the transmission side terminal when an error occurs at any of reception side terminals (step S54, S43).

And at the transmission error detection circuit 9 of a transmission terminal at which a transmission has been received normally and ACK data has been delivered as RSP 110, an echo back error, detecting data being different from data delivered from the terminal of itself, is detected (step S30). This fact is announced to the buffer control circuit 5. Therefore, an occurrence of an error at any of reception side terminals at multi-destination communication is detected and reception data at multi-destination communication is erased from the receiving buffer (step S62).

At a transmission side terminal, RSP 110 sent back from a reception side terminal after EOD 104 also at multi-destination communication in the similar way as at non-multi-destination communication, is converted into parallel data from serial data at the communication control circuit 6. RSP data is checked at the transmission error detection circuit 9 (step S6, S7, S8). In the case where the RSP data coincides with a multi-destination address, it is judged that a transmission has been received by all of the reception side communication terminals and completion of normal transmission is announced to the buffer control circuit 5 (step S9), and completion of normal transmission and allowance of writing in of new transmission data are announced to the control microcomputer 30 through the microcomputer interface control circuit 2.

In the case where the transmission error detection circuit 9 judges that the RSP data is NAK (step S8), an occurrence of a NAK error is announced to the buffer control circuit 5 (step S13). The buffer control circuit 5 announces an occurrence of an error to the control microcomputer 30 through the microcomputer interface control circuit 2 and requests re-sending of transmission data.

In addition, in the aforesaid embodiment, transmission destination address data indicating multi-destination communication is expressed by the same bit length as that at non-multi-destination communication. However, it is possible to express multi-/non-multi-destination only by the head bit of transmission destination address data.

FIG. 9(a) through FIG. 9(f) are schematic diagrams showing bit-configuration examples of transmission destination address data, ACK data, and NAK data at non-multi-/multi-destination.

Non-multi-destination communication, as shown in FIG. (a), expressed by the fact that the head bit $b_7$ of transmission destination address data is a higher priority signal "D" (dominant) at the transmission line 50, and addresses designating reception side terminals are expressed by the remaining seven bits $b_6$ through $b_0$ (refer to FIG. 9(a)). Non-multi-destination ACK data sent back to the non-multi-destination address, expressing the transmission destination address, is so configured as shown in FIG. 9(b), and non-multi-destination NAK data in FIG. 9(c). To be concrete, non-multi-destination ACK data has a head bit $b_7$ being "D," which shows the same value as transmission address received by the other seven bits $b_6$ through $b_0$, and non-multi-destination NAK data is composed by all "D"s.

Multi-destination communication is, as shown in FIG. 9(d), expressed by the fact that the head bit $b_7$ of transmission destination address data is a lower priority signal "P" (passive) at the transmission line 50. The second bit $b_6$ following the head bit distinguishes multi-destination ACK data from multi-destination NAK data respectively. Accordingly, in case of multi-destination communication, transmission destination address has two bits. ACK data sent back to this multi-destination address from reception side terminal is so configured as shown in FIG. 9(e) and NAK data in FIG. 9(f) respectively.

In addition, in the aforesaid example, each of the transmission destination address data, ACK data and NAK data, at multi-destination communication has two bits, however, it is also possible that it has the same bit length as non-multi-destination communication and the third and the following bits are used optionally. FIG. 10 is a schematic diagram showing one example of such a bit configuration.

To be concrete, as shown in FIG. 10(c), it is configured such that the kinds of an overrun error and a reception error are indicated by the third and the following bits $b_5$ through $b_0$ of multi-destination NAK data. In addition, the third and the following bits $b_5$ through $b_0$ of the other multi-destination address data and multi-destination ACK data have, as shown in FIG. 10(a) and FIG. 10(b), optional values.

Further, in the aforementioned example, ACK data and NAK data are expressed intensively in the second one bit. However, a second bit and the following bits may be used as ACK data and NAK data of each multi-destination group by grouping each communication terminal to multi-destination groups whose number is obtained by subtracting one from a bit length used as a transmission destination address. FIG. 11(a) through FIG. 11(c) are schematic diagrams showing examples of such bit configurations.

To be concrete, FIG. 11(a) shows transmission destination addresses at multi-destination communication only with the multi-communication groups 1, 2, 3, 4 and 7, in which groups allowing multi-destination-receiving are indicated by bits of lower priority signals "P" (passive) at the transmission line 50 and groups prohibiting multi-destination receiving are indicated by bits of higher priority signals "D" (dominant) at the transmission line 50. FIG. 11(b) shows ACK data of the case where transmission destination address is so configured as FIG. 11(a). FIG. 11 (c) shows NAK data of the case where a transmission has not been received normally in multi destination group 4, in which NAK is expressed by making bit corresponding to the group 4 to be a higher priority signal at the transmission line 50.

As aforedescribed, according to the present invention, a configuration as follows is adopted, a NAK register storing NAK data being of a higher priority (dominant) signal train is newly installed as a register for RSP other than an ACK register. The NAK register is controlled by the RSP control circuit so as to deliver RSP. Therefore, it becomes possible to announce to transmission side terminals and other reception side terminals the fact that a reception error or an overrun error occurs at a communication terminal during multi-destination communication, thereby solving such a disunity that some reception side terminals receive a transmission normally and the others abnormally.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A multi-destination communication control apparatus, provided respectively at a plurality of communication terminals connected to a transmission line so as to carry out multi-destination and non-multi-destination communication which transmits a same content message from one communication terminal to at least one of said communication terminals, said control apparatus comprising:

a supervision circuit which supervises states of transmitting and receiving;

an ACK register which stores acknowledgement data indicating that a transmission from a transmission side terminal has been received normally, in the case where said supervision circuit has detected the above fact;

a multi-/non-multi-destination detection circuit which detects a signal showing that a communication is a multi-destination communication;

an RSP control circuit which controls said ACK register so as to transmit said acknowledgement data to a transmission side terminal, in the case where said multi-/non-multi-destination detection circuit has detected that a communication is a multi-destination-communication and said supervision circuit has detected that a transmission has been received normally;

a receiving buffer which temporarily stores received data; and a NAK register which stores negative acknowledgement data, having higher priority than said acknowledgement data, showing that a transmission from a transmission side terminal has not been received normally, in the case where said supervision circuit has detected the above fact;

wherein said RSP control circuit controls said NAK register so as to transmit said negative acknowledgement data to a transmission side terminal, in the case where said multi-/non-multi-destination detection circuit has detected a signal expressing a multi-destination communication, and said supervision circuit has detected something abnormal.

2. A multi communication control apparatus as set forth in claim 1, wherein contents stored in said receiving buffer are erased, in the case where said multi-/non-multi-destination detection circuit has detected that the communication is the multi-destination communication, and said negative acknowledgment data is transmitted from another terminal.

3. The multi communication control apparatus as set forth in claim 1, further comprising:

an overrun detection circuit delivering a signal to said RSP control circuit to send said negative acknowledgement data when said receiving buffer is in the full state; and a reception error detection circuit delivering a signal to said RSP control circuit to prohibit said ACK register from sending said acknowledgement data when said reception error detection circuit detects that a transmission from a transmission side terminal has not been received normally.

* * * * *